Patented Aug. 25, 1953

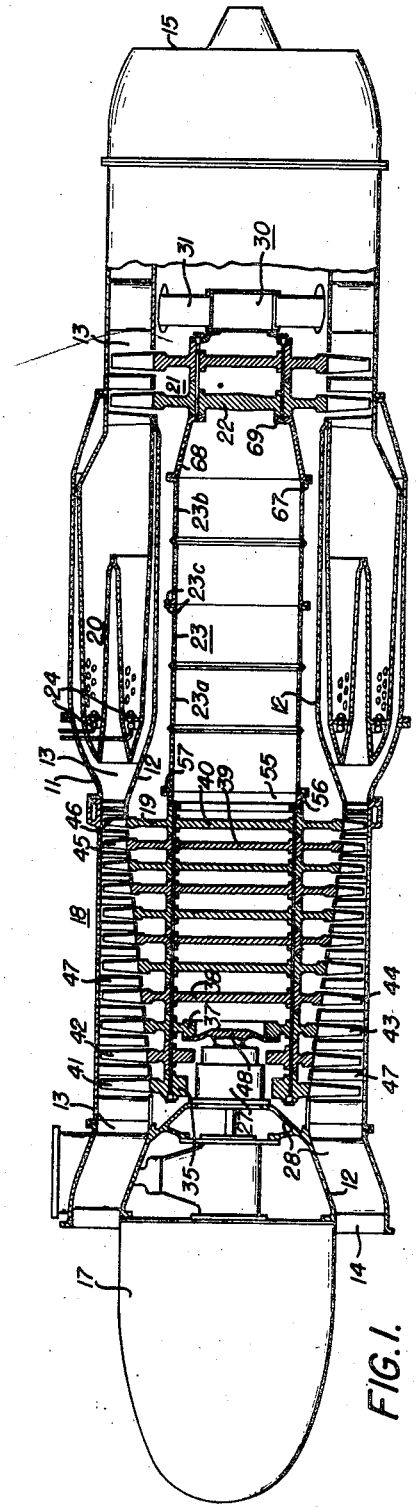

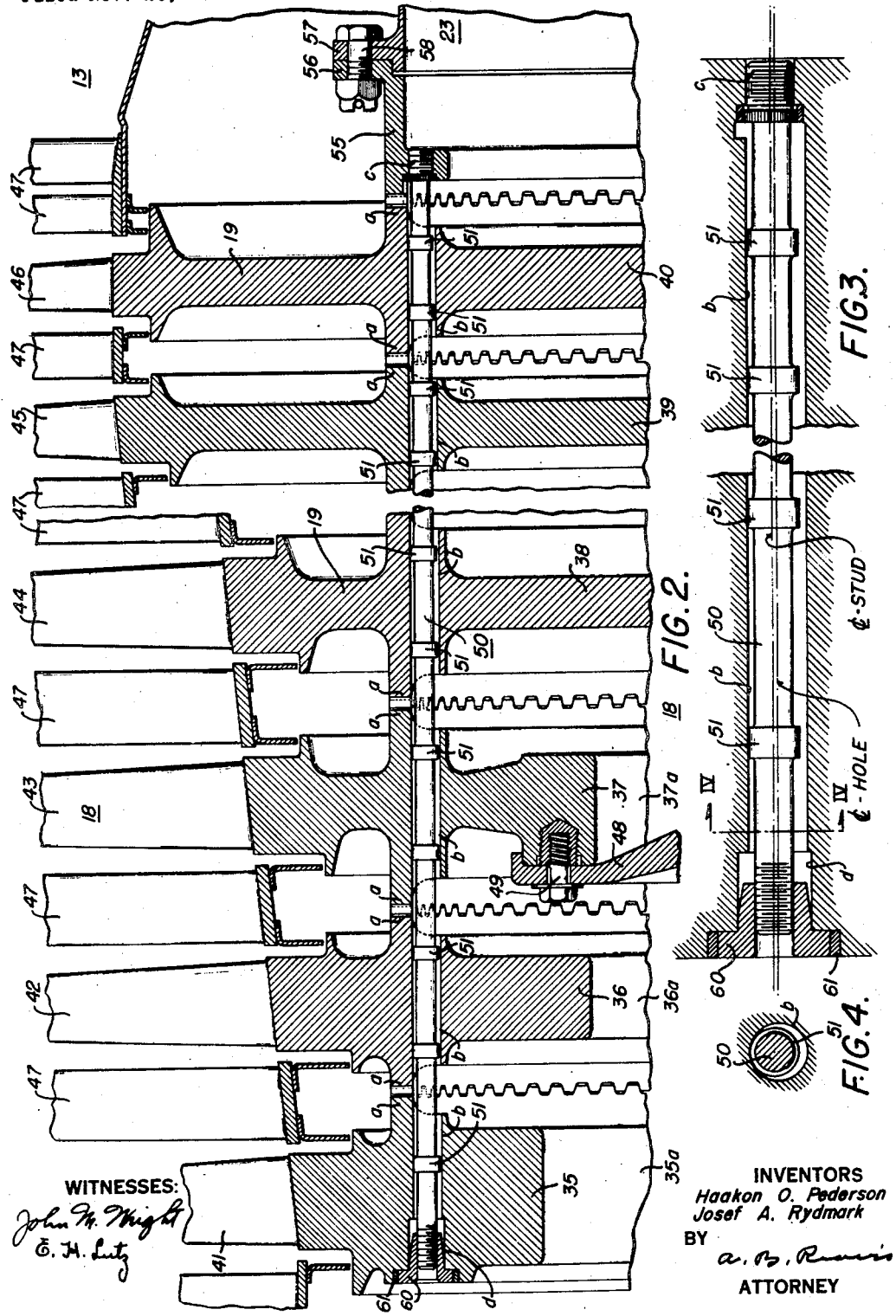

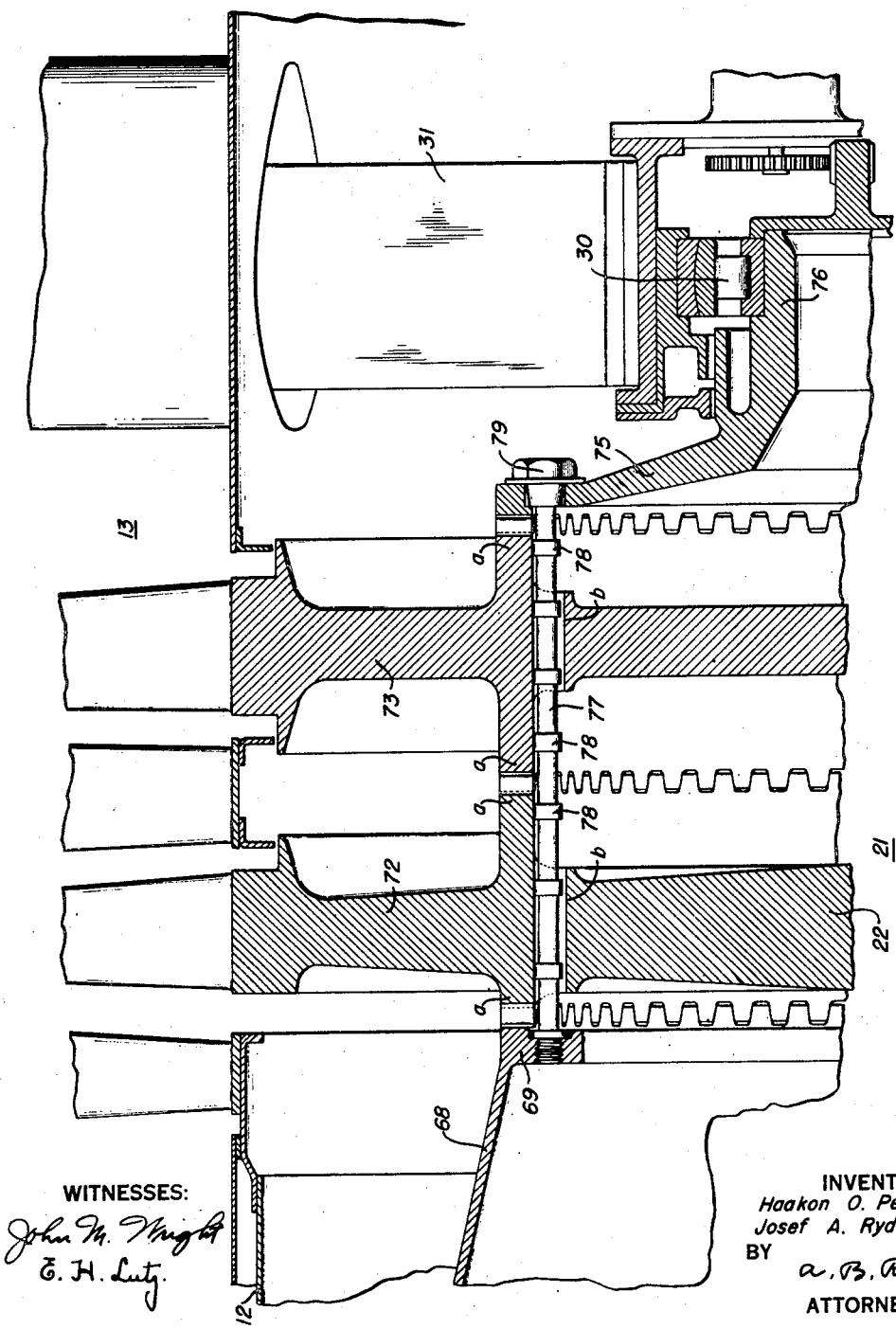

2,650,017

UNITED STATES PATENT OFFICE 2,650,017

GAS TURBINE APPARATUS

Haakon O. Pedersen, Philadelphia, and Josef A. Rydmark, Lansdowne, Pa., assignors to Westinghouse Electric Corporation, East Pittsburgh, Pa., a corporation of Pennsylvania Application November 26, 1948, Serial No. 61,972

5 Claims. (Cl. 230—134)

This invention relates to elastic fluid machines, such as gas turbine power plants, and has for an object the provision of improved apparatus of the class described.

It is more specifically an object of the invention to provide an improved gas turbine power plant having novel features of construction exhibiting advantages in weight distribution and simplicity of design that are particularly desirable with aircraft gas turbine engines of large size and high thrust rating.

Another object of the invention is the provision of an improved gas turbine power plant having a spindle aggregate including a compressor rotor, shaft and turbine rotor constructed and arranged to facilitate manufacture, assembly and repair of the apparatus.

A further object of the invention is the provision of an improved gas turbine engine embodying features of construction which render feasible the mounting of the rotor aggregate on only two spaced bearings, thereby simplifying the construction and arrangement of supporting struts and other load-carrying members of the engine.

Features of the invention include the provision of a rotor assembly for the compressor or turbine comprising a plurality of discs having interlocking clutch faces and clamped in coaxial engagement by means of a number of longitudinally arranged studs. These studs are disposed eccentrically in oversized bores formed in the discs, so that each stud engages the radially outward walls of the bores through which it extends. In this way the structure and studs are afforded adequate clearance to prevent seizure due to unequal expansion or displacement by other causes, while each stud will be insured support over its entire length when the rotor is operated at high speed.

It is, accordingly, a further object of the invention to provide an improved gas turbine power plant embodying the aforesaid features of construction in a practical form.

Another object is to provide an improved rotor structure in which solid discs may readily be employed to effect favorable distribution in weight.

Still another object of the invention is the provision of an engine of the type described in which the disc couplings, studs and related elements are constructed and arranged to reduce the possibility of fatigue or creep failure, and to insure maximum resistance to accidental displacement or distortion of the parts, under the severe temperatures and operating conditions to which such engines are subjected.

These and other objects are effected by our invention as will be apparent from the following description and claims taken in connection with the accompanying drawings, forming a part of this application, in which:

Fig. 1 is a schematic elevational view, mainly in section, of an aviation gas turbine power plant constructed in accordance with the invention;

Fig. 2 is a fragmentary sectional view, in enlarged detail, of portions of the compressor assembly shown in Fig. 1;

Figs. 3 and 4 are diagrammatic enlarged detail views illustrating one of the studs of the apparatus shown in Fig. 2;

Fig. 5 is a fragmentary sectional view, in enlarged detail, of a portion of the turbine rotor of the apparatus shown in Fig. 1;

Fig. 6 is a fragmentary sectional view of a disc and associated stud for a compressor rotor assembly embodying the invention in a form different from that of Fig. 2 and taken along the line VI—VI of Fig. 7.

Fig. 7 is a fragmentary end view of the compressor disc shown in Fig. 6; and

Fig. 8 is a sectional view constituting a development of the disc shown in Fig. 7 along the arc VIII—VIII thereof.

The present invention may be employed in the construction of either a turbojet or turboprop engine, the apparatus illustrated in Fig. 1 being of the turbojet type and comprising a cylindrical outer casing structure 11 having mounted therein a sectional core structure 12 for defining an annular fluid flow passageway 13, which extends axially through the power plant from an annular air inlet opening 14 to a rearwardly disposed discharge nozzle 15. The elements of the power plant are arranged in alignment with the axis thereof, thus minimizing the frontal area and drag incident to forward motion of the aircraft (not shown) which will carry the turbojet with the inlet opening pointed in the direction of flight. The main elements of the engine include a cowl or fairing 17, housing auxiliary control and starting equipment (not shown), an axial flow compressor 18 having a rotor assembly 19, annular combustion apparatus 20, and a turbine 21 having a rotor assembly 22 which is operatively connected to the compressor rotor through the medium of a tubular shaft 23 disposed interiorly of the combustion apparatus. Associated with the combustion apparatus 20 are a plurality of annular fuel manifolds and nozzles 24, which are supported on suitable radial struts (not shown) through which the usual fuel supply lines are adapted to extend.

According to the invention, as hereinafter more fully described, the compressor rotor assembly 19, shaft 23 and turbine rotor assembly 22 constitute a spindle aggregate that is journaled on two bearings, consisting of a forwardly disposed thrust bearing 27 supported by means of a load carrying structure and struts 28 disposed in advance of the compressor, and a rear bearing 30 supported by radial struts 31 which are disposed downstream with respect to the turbine 21. The general principles of operation of such a gas turbine power plant are well known. Air entering the air inlet opening 14 is compressed by the compressor 18 and conducted through the annular passage 13 to the combustion apparatus 20, where fuel supplied by way of nozzles 24 is burned to create the necessary motive fluid, which is expanded through the turbine 21 and finally discharged by way of the nozzle 15, for establishing propulsive thrust.

According to the invention, the rotor assembly 19 of the compressor 18 comprises a plurality of components, some of which are annular and the majority of which are solid discs. As best shown in Fig. 2 these components are designated in part by the reference characters 35 to 40 inclusive, and may constitute successive stages of the compressor. Each of the rotor components, which will hereinafter be referred to by the conventional term, discs, including those designated 35 to 40 inclusive, is provided with a plurality of radially disposed blades, designated by the reference characters 41 to 46, respectively. Arranged in cooperative relation with the rotary blades carried by the turbine rotor 19 are a plurality of annular diaphragms carrying radial stationary blades, such as those indicated by the reference character 47 in Fig. 2, it being understood that any suitable means for mounting the diaphragms in the casing structure 11 may be provided.

The discs of the compressor rotor 19 are assembled in coaxial relation, each of the sides of each disc having formed thereon a concentric annular clutch portion a on which radially disposed teeth are formed, the clutch portions a of adjacent discs being thus adapted to be interlocked together, as shown in Fig. 2. The annular clutch portions a and the teeth formed thereon are elevated or projected from the side faces of the respective compressor discs, so that the main portions of adjacent faces of the discs are separated from each other inwardly and outwardly of the engaging clutch portions. In the form of the apparatus illustrated in the drawings, the rearwardly disposed compressor discs including the discs 38, 39 and 40 have solid central portions, while the forwardly disposed discs 35, 36 and 37 are provided with somewhat enlarged inner web portions surrounding central apertures 35a, 36a and 37a, respectively. For supporting the compressor rotor 19 on the frontal thrust bearing assembly, the disc 37 is secured to a suitably flanged journal member 48 by means of bolts 49. As shown in Fig. 1 the journal member 48 has a central portion that is journaled in the forward thrust bearing assembly 27.

The interlocking compressor discs are held in assembled relation by means of a plurality of longitudinally disposed stay rods or studs 50 which are mounted in suitable registering bores formed in the respective discs, the bores being angularly spaced about and equidistant from the axis and the rotor assembly. As best shown in Fig. 2 of the drawings, the discs of the compressor rotor 19 have formed therein longitudinally arranged bores b, which are angularly spaced about the axis thereof, as illustrated in the apparatus shown in Fig. 7, and which are adapted to be aligned or brought into registration when the clutch faces a of the respective discs are assembled together. Each of the plurality of studs 50 is thus adapted to be received in the longitudinally aligned bores of all of the discs of the rotor, as shown in Fig. 2.

The present disclosure of the invention illustrates a preferred form of stud 50 which is adapted to overcome undesired difficulties of assembly, such as possible seizure in the bores through which it extends. The stud 50 is for this reason made small enough to provide a free or unrestricted fit in the aligned bores b, and is provided with a plurality of spaced collars 51 which are adapted to determine the points at which the stud will touch the wall of each bore b, for reducing fatigue and creep failure when the rotor unit is revolving at full speed. The opposite ends of each of the studs 50 are threaded, one end of the stud being screwed into a suitable bore c formed in a ring member 55. The latter has at one side an annular group of teeth cooperating with the clutch portion a of the adjacent disc 40, and at the other side an annular flange 56 that is attached to a complementary flange 57 of the tubular shaft 23. Suitable bolts 58 may be provided for securing the flanges 56 and 57 together. The opposite end of each of the studs 50 projects into a counter-bore d formed in the compressor disc 35, which counter-bore is adapted to receive a suitable nut 60 and lock washer 61 cooperative with the stud.

In order to establish support for each stud 50 over its entire length during operation of the rotor, the respective bores b are drilled at a slightly smaller bolt circle diameter than the threaded bore c and the counter-bore d at the opposite ends of the stud. In other words each stud 50 is disposed eccentrically of the aligned bores b so that the shoulders 51 are adapted to engage only the radially outward wall of each bore, thereby insuring support of the stud when subjected to centrifugal force. This feature of construction is illustrated diagrammatically in Figs. 3 and 4 of the drawings.

It will be noted that the studs 50 are disposed as close to the respective interlocked clutch portions a of the compressor discs as practicable, in order to bring the bending stresses in the end disc 35 and in the ring member 55 to a minimum. By disposing the bores b with the radially outer sides thereof substantially in line with the inside diameters of the aligned clutch portions a of the respective discs, the stress concentration factor in adjacent regions of each disc is minimized. With this construction the amount of material needed for reinforcement of each disc, due to high radial or tangential stress in the region of the bore b, is reduced.

The nut 60 illustrated in Fig. 2 has a tapered outside surface engageable in the counter-bore d and so proportioned that elongation of the nut due to stress will be distributed evenly over the threads of the associated stud 50. While the differential expansion between the assembled compressor disc and the studs 50 would not be expected to constitute a problem under the usual service conditions, it may be desirable to provide means for absorbing any differential expansion that might occur. Referring to the modified form of the invention shown in Figs. 6, 7 and 8, the outer face of the end disc 35' may be adapted to receive an annular bolting plate 62, which is provided with a plurality of boss portions 63 engageable with the surface of the disc 35' and disposed between apertures 64 in the plate which are aligned with the adjacent ends of the studs 50, respectively. Each of the studs 50 is held in place by means of a nut 65, similar to the nut 60 shown in Fig. 2, it being understood that the respective nuts 65 when tightened will bear against the portions of the plate 62 bridging boss portions 63 to cause the ring or plate 62 to bend slightly between the boss portions. During temperature changes the plate 62 will act as a spring to prevent the bolts from being overstressed. If desired, a deformable lock washer 66 may be interposed between each nut 65 and the plate 62, which has recesses for receiving punched marginal portions of the respective washers.

The tubular shaft 23, as shown in Fig. 1, has a diameter sufficient to withstand bending stresses imposed on the spindle aggregate during rotation, and in the present embodiment of the invention is of a diameter substantially equal to that of the annulus of the interlocked teeth of the clutch portions a on the compressor discs. The tubular shaft 23 may be formed by joining a plurality of cylindrical sections 23a and 23b having annular flanges 23c that are secured together by bolts or other suitable means (not shown). As already explained, the forwardly disposed flange 57 of the shaft 23 is secured to the compressor rotor structure. A rearwardly disposed annular flange 67 is likewise provided for securing the shaft to the end of a frusto-conical drum 68, which has an annular flange 69 suitably bolted to the rotor 22 of the turbine 21.

Referring to Fig. 5 of the drawings, the turbine rotor assembly 22 comprises a pair of turbine discs 72 and 73, having annular clutch portions a for interlocking the discs in the same manner as already explained in connection with the compressor rotor shown in Fig. 2. The turbine disc 72 likewise is provided with a forwardly projecting clutch portion a which is engageable with the complementary teeth of a similar clutch portion formed on the frusto-conical drum member 68. The rearwardly projecting clutch portion a of the turbine disc 73 is similarly engaged by the complementary teeth of a bearing member 75, which has a suitably formed shaft portion 76 journaled in the rear bearing 30 of the power plant.

For holding the drum member 68, turbine discs 72 and 73 and bearing member 75 in assembled relation, a plurality of longitudinally arranged, angularly spaced studs 77 are provided. The studs 77 extend through suitably aligned bores b formed in each of the turbine discs 72 and 73, and are provided with a plurality of shoulders 78 which, like the shoulders 51 on the studs 50, are arranged eccentrically of the bores b for insuring support of the studs against centrifugal force. As shown in Fig. 5, the forward or left-hand end of each stud 77 is screw-threadedly attached to the flange 69 of the drum member 68, while the opposite end is fitted with a suitable nut 79 for securing the stud to the bearing member 75. The elements of the turbine assembly 21 just described are constructed and arranged to provide the same advantages as have hereinbefore been set forth with relation to the compressor rotor assembly, and need not be repeated in detail.

From the foregoing description of a typical gas turbine power plant constructed in accordance with the invention, it will now be apparent that the improved spindle aggregate, comprising the compressor rotor, large diameter hollow shaft and turbine rotor in the order named, is well adapted for support on fore and aft bearings, without the requirement of the conventional intermediate bearing, thereby dispensing with elements and structure which would otherwise add weight to the apparatus. It will furthermore be seen that the construction and arrangement of the compressor and turbine rotors disclosed, including the stacked and interlocked discs secured by longitudinally arranged studs equally spaced from the rotor axis, and the tubular connecting shaft having bolting flanges of a corresponding diameter, not only facilitates manufacturing and assembly operations, but also insures proper balance and distribution of bending and other stresses on the spindle aggregate of the power plant. The engine is thus equipped to exhibit favorable performance characteristics over a long service life, while nevertheless embodying readily accessible features of construction adapted to render more efficient the maintenance work incident to aircraft operation.

What is claimed is:

1. A rotor assembly for an elastic fluid machine comprising a plurality of discs arranged in concentric face-to-face alignment, said discs having formed thereon inner and outer annular lateral faces separated by projecting concentric clutch portions having teeth, said teeth of said clutch portions being interlocked and constituting the sole contact between adjacent discs, said discs having a plurality of registering bores formed closely adjacent said clutch portions, said bores extending longitudinally of and radially spaced from the axis of the rotor assembly, end elements disposed coaxially at opposite ends of said plurality of discs and having bores registering with the first-named bores, but slightly eccentric thereof in a radially outward direction, and a plurality of studs constructed and arranged for holding said discs in assembled relation, the ends of said studs being secured in said bores in the end elements, said studs being mounted longitudinally in the respective aligned bores in said discs and engageable with only the radially outer wall of each of the latter bores.

2. In a gas turbine power plant having a spindle aggregate, a rotor assembly therefor comprising a plurality of engaging rotor discs, said discs having concentric annular groups of axially projecting interlocking teeth formed on adjacent faces thereof, said discs having angularly spaced openings formed equidistant from the rotor axis and adapted to register in axial alignment when the discs are assembled, holding means at each end of said rotor assembly disposed on the same axial plane as said openings in the discs but centered along parallel centerlines at slightly greater distances from the rotor axis, and a plurality of relatively small diameter studs extending through said openings longitudinally of the spindle aggregate, the maximum diameter of each of said studs being twice the distance between the centerline of the holding means and the outermost walls of the openings in said discs, the opposite ends of each stud being cooperative with the corresponding holding means for clamping said discs in assembled relation, whereby each stud engages only the radially outer wall of each of said openings and is rendered free from seizure while being adequately supported against centrifugal force by all discs in the assembly.

3. In a gas turbine power plant having a spindle aggregate, a rotor assembly therefor comprising a plurality of engaging rotor discs, said discs having concentric annular groups of axially projecting interlocking teeth formed on adjacent faces thereof, said discs having angularly spaced openings formed equidistant from the rotor axis and adapted to register in axial alignment when the discs are assembled, holding means at each end of said rotor assembly having openings disposed on the same axial plane as said openings in the discs but centered at slightly greater distances from the rotor axis, and a plurality of studs adapted to extend through said openings longitudinally of the axis of spindle aggregate, said studs having spaced shoulders eccentrically disposed in the respective openings and smaller in diameter than said openings to prevent seizure, the opposite ends of each stud being cooperative with the corresponding openings in said holding means for clamping said discs in assembled relation with said shoulders engaging the radially outward walls of the respective openings, whereby each stud is supported at spaced intervals over its whole length against centrifugal force when the rotor is driven at full speed.

4. A rotor assembly for an elastic fluid machine comprising a plurality of components having annular peripheries and arranged in concentric face-to-face alignment, said components having formed thereon inner and outer lateral annular faces separated by axially projecting concentric clutch portions having teeth, said teeth of the respective clutch portions being interlocked and constituting the sole contact between adjacent components, said components having a plurality of longitudinally registering bores formed closely adjacent said clutch portions and radially spaced from the axis of the rotor assembly, a plurality of elongated studs respectively extending through the aligned bores in said components, an end member mounted on one end of said rotor assembly having an annular flange to which one end of each stud is secured, an annular bolting plate having spaced projecting bosses engaging the component on the opposite end of said rotor assembly intermediate said bores therein, said bolting plate having apertures formed between said bosses in alignment with said bores, and nuts secured to said studs and bearing on said bolting plate for holding said components of the rotor assembly together.

5. A rotor assembly for an elastic fluid machine including a plurality of components of which a major number are solid discs, each of said solid discs having a flat central web portion encompassed by an annular toothed clutch portion, the clutch portions of each of said discs projecting axially for engagement with corresponding portions of adjacent discs, each of said discs having a plurality of circumferentially spaced openings formed therein adjacent said clutch portions, said openings extending longitudinally of the rotor axis and being adapted to register in axial alignment when said clutch portions are engaged, said rotor assembly also including opposite end components having openings registering with the first-named openings but slightly eccentric thereto in a radial outward direction, and a plurality of elongated studs of smaller diameter than said first-named openings and having opposite ends secured in said openings in said end components, said studs extending through the respective axially aligned groups of said first-named openings contiguous to said clutch portions, each of said studs engaging only the radially outer wall of each first-named opening to ensure support against centrifugal force during operation of the rotor assembly.

HAAKON O. PEDERSEN.
JOSEF A. RYDMARK.

References Cited in the file of this patent

UNITED STATES PATENTS

| Number | Name | Date |
|---|---|---|
| 1,186,438 | Roder | June 6, 1916 |
| 2,427,614 | Meier | Sept. 16, 1947 |
| 2,452,782 | McLeod | Nov. 2, 1948 |
| 2,461,242 | Soderberg | Feb. 8, 1949 |

FOREIGN PATENTS

| Number | Country | Date |
|---|---|---|
| 402,525 | Germany | Sept. 20, 1924 |
| 492,252 | Germany | Feb. 20, 1930 |

OTHER REFERENCES

Technical Data on Jet Engine, May 2, 1946 (Figure 42 only).